May 7, 1963   D. B. EKSTROM   3,088,383
TRAILER DUMP TRUCK
Filed April 6, 1959   2 Sheets-Sheet 1
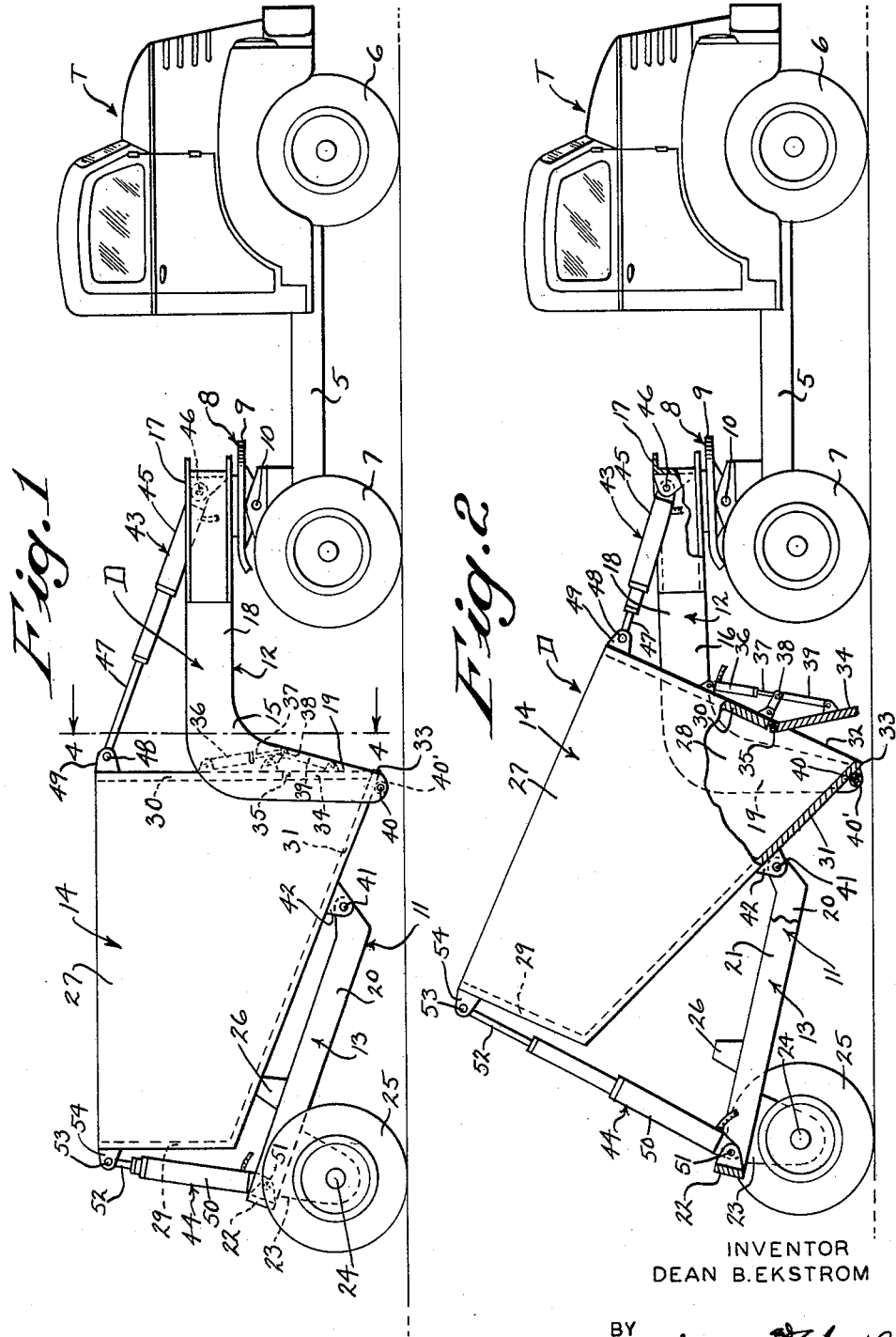
INVENTOR
DEAN B. EKSTROM
BY Wright Wright
ATTORNEYS May 7, 1963   D. B. EKSTROM   3,088,383
TRAILER DUMP TRUCK
Filed April 6, 1959   2 Sheets-Sheet 2
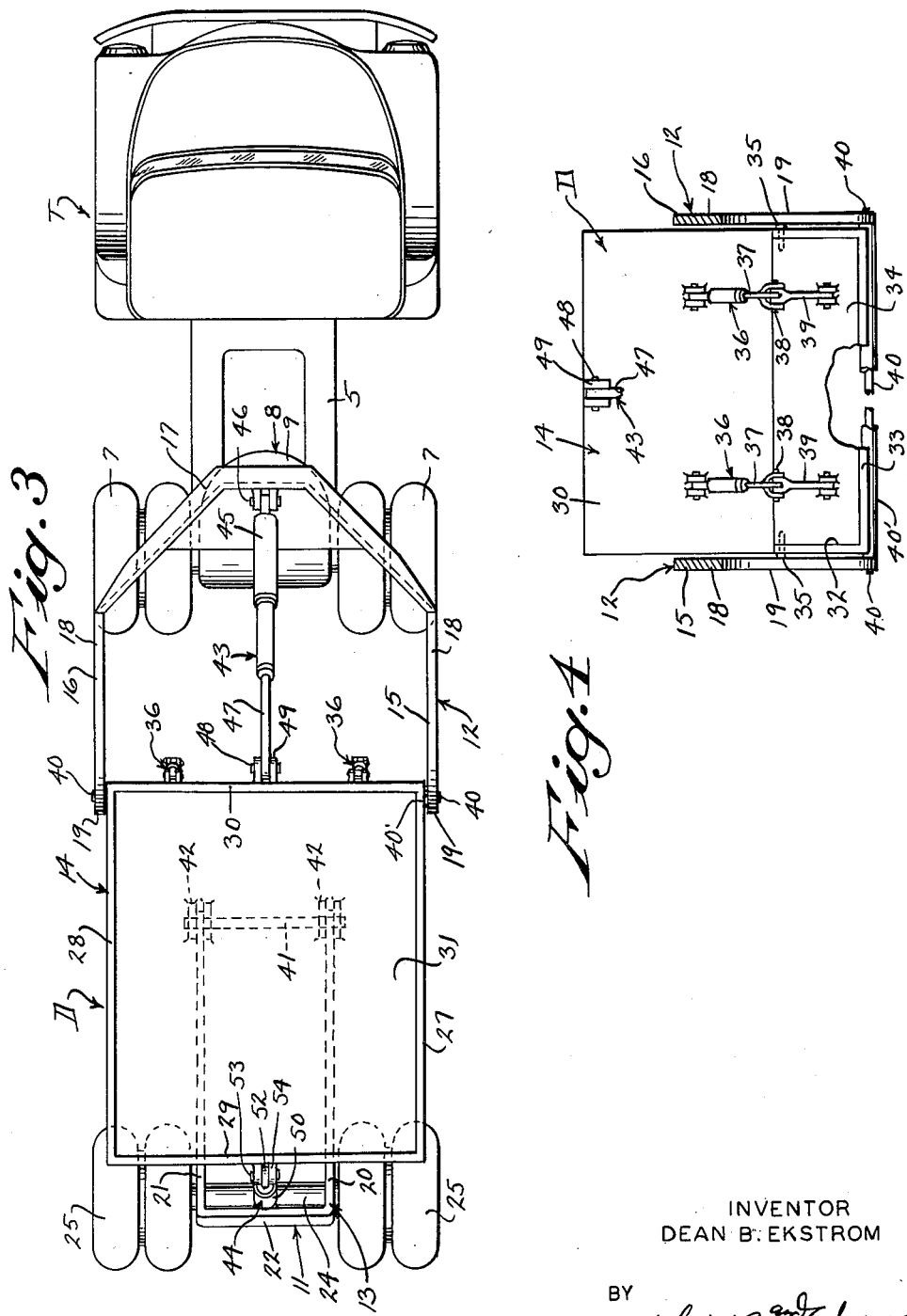
INVENTOR
DEAN B. EKSTROM
BY
*Wright and Wright*
ATTORNEYS

United States Patent Office 3,088,383
Patented May 7, 1963

---

3,088,383
TRAILER DUMP TRUCK
Dean B. Ekstrom, Amery, Wis.
Filed Apr. 6, 1959, Ser. No. 804,513
7 Claims. (Cl. 94—46)

This invention appertains to dump trucks and more particularly to a trailer dump truck having a forwardly swinging discharge position.

One of the primary objects of my invention is to provide a trailer dump truck having a novel frame and hopper arrangement, whereby the hopper can be tilted forwardly toward the pulling tractor truck during the discharge of the load, so as to effectively shorten the overall length of the apparatus and thus increase stability and maneuverability of the apparatus.

Another salient object of my invention is the provision of means, whereby the lower edge of the discharge mouth of the hopper and/or the closure gate for the discharge mouth can be effectively used as means for uniformly spreading the material being dumped to a desired depth and thereby eliminate the use of spreader boxes, bulldozers and similar appliances, the dump truck being particularly useful in building roadways.

A further object of my invention is to provide a trailer dump truck, so constructed that upon the opening of the discharge gate much of the load will be discharged by gravity and thus eliminate the power needed to raise the hopper or box to a complete dumping position; the arrangement also being such that as the load is dumped, the weight of the trailer and load is shifted toward the fifth wheel of the pulling tractor truck, thus increasing weight on the rear axle of the tractor and the tractive force on the rear drive wheels of the tractor.

A further important object of my invention is the provision of a trailer dump truck embodying a front yoke or gooseneck shaped frame section coupled with the fifth wheel of a pulling tractor truck and a rear wheeled frame section and a dump hopper pivotally connecting said frame sections with means for raising and tilting the hopper toward the front frame section to a full dumping position.

With these and other objects in view, the invention consists in the novel construction, arrangement and formation of parts, as will be hereinafter more particularly described and claimed, and illustrated in the accompanying drawings, in which drawings, FIGURE 1 is a side elevational view showing my novel trailer dump truck connected with a pulling tractor truck, the dump truck being shown in its non-dumping position;

FIGURE 2 is a view similar to FIGURE 1, but showing the hopper of the dump truck in its full dumping position, parts of the view being shown broken away and in section to illustrate structural detail;

FIGURE 3 is a top plan view of the trailer dump truck coupled with a pulling tractor truck, the dump truck being shown in its non-dumping position, and FIGURE 4 is a transverse sectional view through the trailer dump truck taken on the line 4—4 of FIGURE 1, looking in the direction of the arrows.

Referring to the drawings in detail, wherein similar reference characters designate corresponding parts throughout the several views, the letter D generally indicates my novel trailer dump truck and T a pulling tractor truck therefor.

The tractor truck T can be considered as of a type now commonly used in semi-trailer work and hence includes a frame 5 having front steering wheels 6 and rear drive wheels 7. Mounted upon the frame 5 is the usual fifth wheel 8 to which the trailer is attached for swinging and rocking movement, it being noted that the fifth wheel platform 9 is mounted for rocking movement on a transversely extending shaft 10.

My trailer dump truck D includes a novel frame 11 embodying a front section 12 and a rear section 13. These sections support, in a novel manner, the dump truck hopper or box 14. The front frame section 12 is in the nature of a yoke and is of a gooseneck shape and includes side frame bars 15 and 16 connected at their forward ends by a substantially U-shaped front frame bar 17. The central portion of this frame bar is connected with the fifth wheel 8 of the pulling tractor or truck T. The side frame bars 15 and 16 are of an angle shape in side elevation and thus each side frame bar includes a horizontal portion 18 and a depending substantially vertical portion 19.

The rear frame section 13 includes forwardly extending spaced parallel side frame bars 20 and 21 connected at their rear ends by a rear cross frame bar 22. The side frame bars 20 and 21 support depending brackets 23 and these brackets carry an axle 24 on which are rotatably mounted the rear trailer wheels 25. The side frame bars 20 and 21 can carry bumpers 26, if such should be desired for the dump truck hopper or box 14, as will later appear.

The dump hopper or box 14 includes side walls 27 and 28, a rear wall 29, a front wall 30 and a bottom wall 31. The bottom wall 31 inclines forwardly and downwardly from the rear wall 29 toward the front wall 30 and hence the rear wall 29 is of a less height than the front wall 30. The lower end of the front wall 30 is provided with a discharge mouth 32 and this discharge mouth extends the entire width of the body or box 14. This leaves the forward edge 33 of the bottom wall 31 clear when the discharge mouth is open and hence this edge constitutes a leveler blade for the load when the same is being dumped. The discharge mouth 32 is normally closed by a gate 34 and this gate is pivoted at its upper end, on pivots 35 carried by the side walls 27 and 28. The gate can be opened and closed in any desired manner, but I prefer to provide hydraulic rams 36 for this purpose. As illustrated, the piston rod 37 of the hydraulic rams 36 are pivotally connected, as at 38, at the points of juncture of the links of toggles 39. The outer ends of the links of the toggles are connected respectively to the gate 34 adjacent to its lower end and to the front wall 30 immediately above the upper edge of the gate. The controls for the rams 36 are of a conventional character and can be located in the cab of the pulling tractor truck T.

As heretofore brought out the hopper or box 14 and the front and rear frame sections 12 and 13 are united together in a novel manner to bring about the effective and desired supporting of the hopper and to permit the novel swinging of the hopper for discharge purposes. The forward lower end, of the hopper 14 at the edge 33 of the bottom wall 31 has welded thereto a bearing tube 40' which receives a cross shaft 40 carried by the lower ends of the side frame beams 15 and 16. Stress is laid on the point of connection of the hopper with the front frame section and this connection results not only in the proper pivoting of the hopper, but also the holding of the forward lower edge of the bottom wall 31 in a desired position for scraping or levelling purposes. The rear frame section 13 extends forwardly under the inclined bottom wall 31 and is pivotally connected thereto by a cross shaft 41. It is to be noted that the forward terminals of the side frame members 20 and 21 are angled upwardly and that the bottom wall 31 carries brackets 42 for receiving the cross-shaft. The cross-shaft extends through the upwardly angled terminals of the said side frame members 20 and 21.

In order to bring about the complete dumping of the hopper or box 14 front and rear hydraulic rams 43 and 44 are provided. The front hydraulic ram 43, has its outermost cylinder 45 pivotally connected, as at 46, to the cross frame member 17 of the front frame section 12. The outermost piston part 47 of the ram 43 is pivotally connected, as at 48 to the front wall 30 of the hopper or box 14 adjacent to the upper end thereof. The front wall 30 can be provided with ears 49 for receiving the piston 47 therebetween and to support the pivot for this ram.

The rear ram 44 has the lower end of its outermost cylinder part 50 pivoted, as at 51, to the rear cross frame bar 22 of the frame section 13 and the upper end of the piston part 52 of the ram 44 is pivotally connected, as at 53, to the upper end of the rear wall 29 of the body or box 14. This rear wall can be provided with spaced ears 54 for receiving the upper end of the piston 52 therebetween and for supporting the pivotal connection.

The hydraulic rams 43 and 44 are of a type now commonly used in the trade and can be purchased as units and the various adjuncts therefor, such as compressors, controls, etc. not shown. The controls are located in the cab of the pulling tractor truck T.

While I have shown hydraulic rams, it is to be understood that other appliances can be used in lieu thereof, such as winches, pull chains and the like.

In operation of my trailer dump truck, the same is moved slowly over the roadway or other place where the load is to be dumped and the gate 34 is moved to an open position by the rams 36. The load will flow out of the hopper or box 14 by gravity and as the truck slowly moves forwardly the load will be spread by the front edge 33 of the bottom wall 31. As a majority of the load will be dumped by gravity, a minimum amount of power is needed to move the hopper 14 to its complete raised dumping position. To complete the dumping and spreading, fluid pressure is released from the inner end of the ram 43 and fluid pressure is admitted to the lower end of the ram 44. This will extend the ram 44 and the rear end of the hopper or box 14 will be raised to an elevated position and the hopper will swing on its pivots 40 and 41. As the truck continues its slow travel, the material will be spread to the desired depth by the front edge 33 of the bottom wall 31. If the truck should be backed during the dumping and spreading operation, the lower edge of the gate 34 will act as a spreader.

In view of the fact that the hopper 14 moves forwardly and downwardly toward the fifth wheel 8, weight is transferred from the rear axle 24 of the dump trailer toward the fifth wheel. This adds to the stability of the complete unit and the added weight on the fifth wheel serves as means of insuring traction of the rear drive wheels 7 of the tractor truck T. If desired, the empty dump trailer can be hauled to the loading zone with the hopper in its inclined forward position.

It can be seen that as the hopper swings upwardly and forwardly the wheel base of the dump trailer is shortened and this adds to the maneuverability and stability of the entire unit.

When it is desired to return the hopper 14 to its lowered load receiving position, fluid pressure is released from the lower end of the ram 44 and fluid under pressure is admitted to the lower forward end of the ram 43. The ram 43 will exert its thrust upwardly and rearwardly to swing the hopper on its pivots and the hopper will then return to its normal position. As the hopper returns to its normal position, the same will strike the bumpers 26, to reduce noise, vibration etc. The rams 43 and 44 can be fluid operated in both directions, should such be desired and in which case, the ram 43 will be pulling while the ram 44 is lifting and vice versa.

In actual operation, the raising of the hopper or box 14 can be assisted by applying the brakes of the tractor trailer T, without engaging the trailer brakes so that inertia of the load and body reacts to assist the dropping of the discharge edge of the box and to raise the rear end of the box. Also the box or hopper may be assisted in its return level position by engaging the trailer brakes and moving the tractor forward.

As heretofore set forth, stress is laid on the pivotal connection of the forward lower end of the hopper 14 with the lower ends of the yoke or gooseneck 12 in that this not only provides the desired pivotal support for the hopper but also serves as an effective means for holding the scraping and levelling edge of the hopper in proper position.

The trailer axle 24 can be a standard commercial item embodying the usual springs, spring attachments, wheels, brakes, etc.

Changes in details may be made without departing from the spirit or the scope of this invention, but what I claim as new is:

1. The combination with a tractor truck including rear traction wheels and a fifth wheel disposed above and adjacent to the traction wheels, of a dump trailer truck including independent front and rear frame sections, ground wheels supporting the rear end of the rear section, said front frame section being of a gooseneck shape and including a front cross-frame bar resting on and connected with the fifth wheel and depending spaced parallel arm portions, said rear frame section including spaced parallel side frame bars and a rear cross-bar, a dump hopper having a discharge outlet at its front lower end, means pivotally connecting the front lower end of the hopper to the depending arm portions of the front gooseneck frame adjacent to their lower ends, the side frame bars of the rear section extending forwardly under said hopper, means pivotally connecting the front ends of the side frame bars to the bottom of the hopper at a point spaced from and in rear of the pivotal connection of the hopper with the arm portions of the front frame section, and extensible means between the front frame section and the front of the hopper and extensible means between the rear end of the hopper and rear frame section for tilting the hopper about the front and rear frame sections for tilting said hopper relative to said frame sections to raise and lower the hopper discharge outlet.

2. The combination with a tractor truck and dump trailer as defined in claim 1, and said means for tilting the hopper on the frame sections including a front hydraulic ram pivotally connected to the front cross bar of the front frame section directly above the fifth wheel of the tractor truck and to the hopper adjacent to the upper front end thereof, and a rear hydraulic ram pivotally connected at its lower end to the rear cross-bar of the rear frame section and pivotally connected to the hopper at its rear upper end.

3. The combination with a tractor truck and dump trailer as defined in claim 2, and said hopper including an inclined bottom wall and a front wall extending above the inclined bottom wall and directly above the front end of the inclined bottom wall, a pivoted gate for closing said discharge outlet, means for raising and lowering the gate, the gate, when in its raised position exposing the front edge of the bottom wall to form a leveling blade for the load being dumped.

4. A dump trailer comprising independent front and rear frame sections arranged in spaced relation, means for uniting and supporting the forward end of the front frame section with a pulling tractor, said front section having a depending rear end ground wheels carried by the rear end of the rear frame section, a dump hopper pivotally connected at its front lower end to the lower extremity of the depending rear end of the front frame section, means pivotally connecting the hopper to the forward end of the rear frame section with the pivot located at a point intermediate the ends of the hopper and adjacent to but spaced from the point of pivotal connection of the hopper with the front frame section, and said hopper having a discharge outlet at its front lower end, the hopper and its connections forming means for uniting the front and rear frame sections together, and extensible means between the forward upper end of the hopper and the forward end of the front frame section and extensible means between the rear end of the hopper and rear frame section at a point spaced from the pivot points of the hopper for tilting and changing the angularity of said hopper relative to said frame sections to raise and lower the hopper outlet.

5. A dump trailer comprising independent front and rear frame sections arranged in spaced relation, said front frame section being of a gooseneck shape and including depending spaced parallel arm portions, said rear frame section including forwardly extending spaced parallel side frame bars, rear wheels carried by the said side frame bars, a hopper having a discharge outlet at its forward lower end, means pivotally connecting the forward lower end of the hopper below its outlet to the lower rear ends of the arm portions of the gooseneck front frame section, means pivotally connecting the forward end of the rear frame section to the bottom of the hopper in rear of the pivotal connection of the hopper with the front gooseneck frame section, extensible means between the front upper end of the hopper and said front frame section and extensible means between the rear of the hopper and rear frame section at a point spaced from the pivot points of the hopper for tilting and changing the angularity of said hopper relative to said frame sections to raise and lower the hopper discharge outlet.

6. A dump trailer as defined in claim 5 and said extensible means between the front of the hopper and the front frame section including a front hydraulic ram pivotally connecting the forward portion of the front frame section with the upper end of the front of the hopper and said extensible means between the rear of the hopper and rear frame section including a rear hydraulic ram pivotally connecting the upper end of the rear end of the hopper with the rear end of the rear frame section.

7. A dump trailer as defined in claim 6 and a gate for normally closing said discharge outlet, means for raising and lowering the gate to an open and closed position, the discharge outlet being directly above the forward lower end of the bottom wall, the gate, in its open position exposing the lower edge of the bottom wall of the hopper with said edge constituting a leveling blade for the material being dumped.

References Cited in the file of this patent

UNITED STATES PATENTS

| | | |
|---|---|---|
| 2,148,798 | Barrett | Feb. 28, 1939 |
| 2,207,424 | Wood | July 9, 1940 |
| 2,271,790 | Allin | Feb. 3, 1942 |
| 2,350,488 | Barrett | June 6, 1944 |
| 2,479,800 | Williams | Aug. 23, 1949 |
| 2,566,556 | Cunningham | Sept. 4, 1951 |
| 2,609,622 | Murray | Sept. 9, 1952 |
| 2,663,231 | Wood | Dec. 22, 1953 |
| 2,861,837 | Morse | Nov. 25, 1958 |
| 2,874,621 | Mentes | Feb. 24, 1959 |

FOREIGN PATENTS

| | | |
|---|---|---|
| 824,601 | France | Nov. 10, 1937 |